Patented Aug. 22, 1944

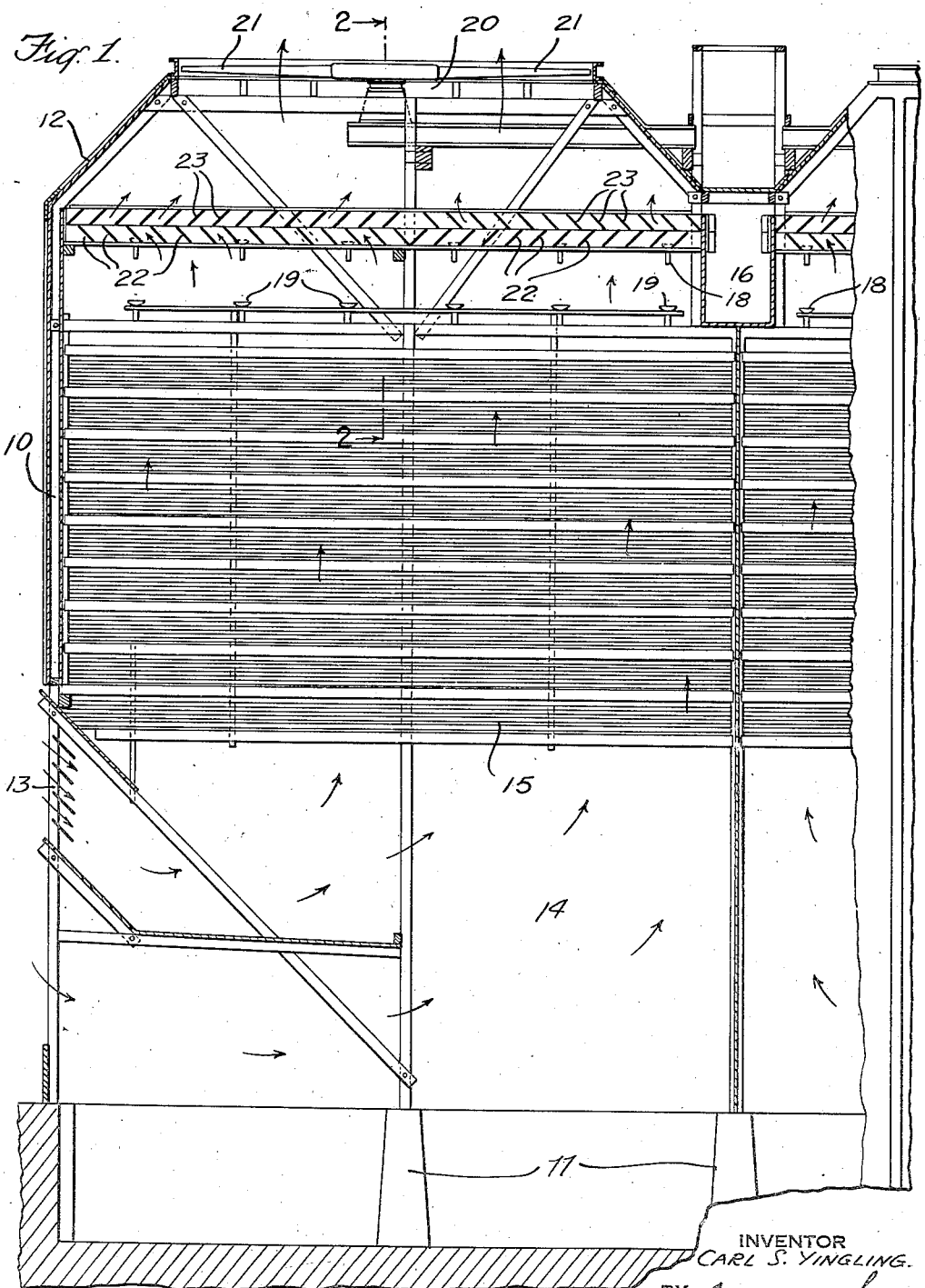

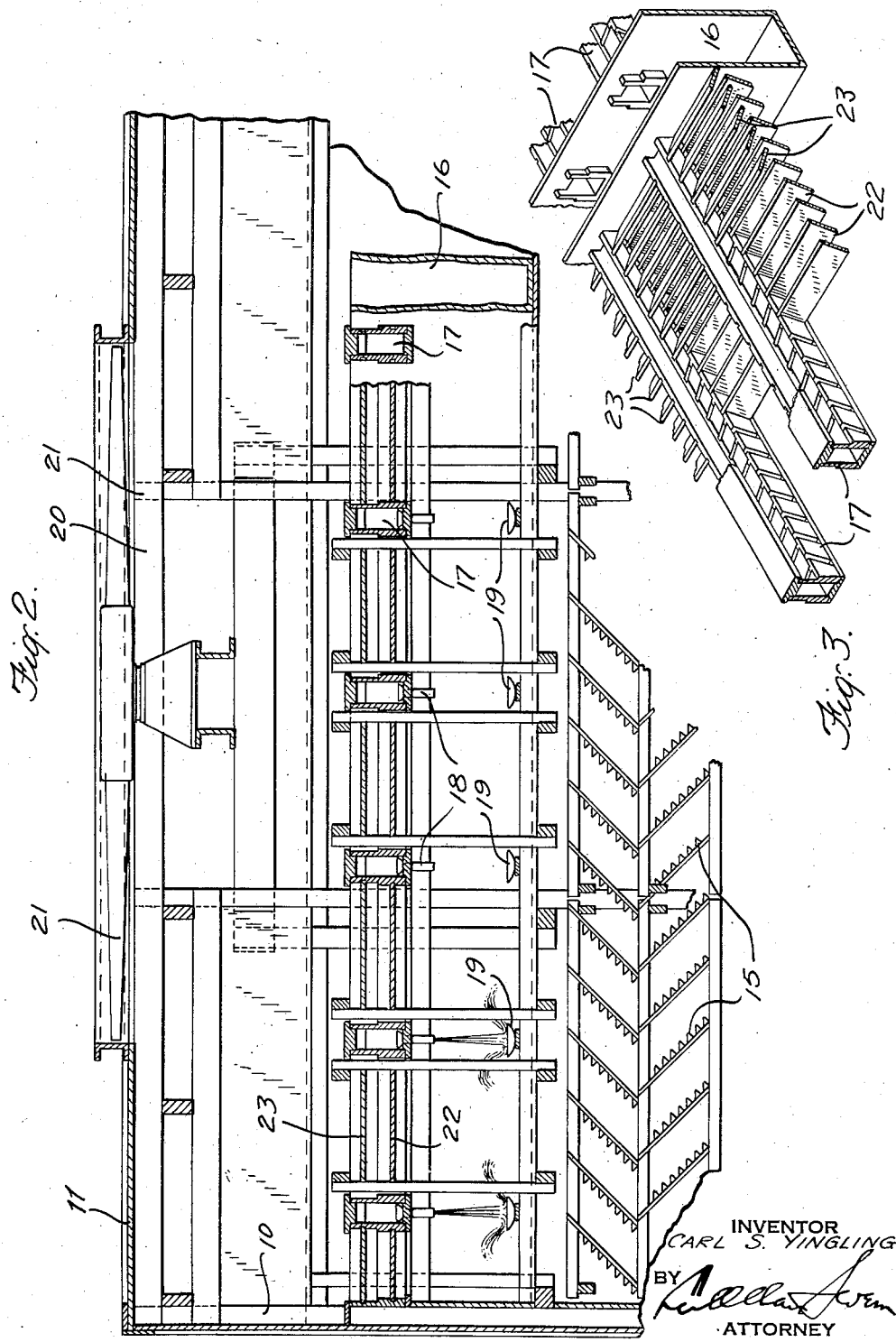

2,356,192

UNITED STATES PATENT OFFICE 2,356,192

COOLING TOWER

Carl S. Yingling, Metuchen, N. J., assignor to Foster Wheeler Corporation, New York, N. Y., a corporation of New York Application October 20, 1942, Serial No. 462,667

9 Claims. (Cl. 183—25)

This invention relates to cooling towers which force the dissipation of heat to the atmosphere from water used in power plants and industrial processes, and more particularly pertains to mechanical draft cooling towers, although the invention is not limited thereto.

The invention provides a cooling tower in which the spray eliminators are disposed at approximately the same elevation as the water distributing troughs or gutters, instead of at a higher elevation than these troughs or gutters, as heretofore. This arrangement affords several advantages, among which may be mentioned, the greater accessibility of the troughs and gutters for inspection, cleaning and repair, the reduced height of the tower, and simpler construction.

The invention will be understood from the following description when considered in connection with the accompanying drawings forming a part thereof, and in which:

Fig. 1 is a vertical sectional view of an induced draft cooling tower embodying the invention;

Fig. 2 is a sectional view, on an enlarged scale, taken on line 2—2 of Fig. 1, and Fig. 3 is a perspective view of part of the trough and gutter system and the spray eliminators of the tower.

Like characters of reference refer to the same parts throughout the several views.

Referring to the drawings, reference character 10 designates the frame of a multi-cell induced draft cooling tower, supported on a foundation 11, and having a shell 12. The tower has an air inlet 13 at one side of the lower portion of the cell 12 and a filling 15 through which the air flows counter-current to water falling in a spray therethrough. Water to be cooled is introduced at a convenient point to the upper part of the tower and flows into a distributing trough 16 and thence into a plurality of distributing gutters 17 extending at right angles to the trough. Water from the gutters 17 flows through down spout tubes 18 onto splash plates 19 disposed above the filling 15. Heated air is discharged from the tower through an air outlet 20 at the top of the tower through the action of an axial flow fan 21 driven by an electric motor or other means, not shown.

The spray eliminators, comprising two rows of spaced and inclined louvers 22 and 23 in the form shown, are located at the same elevation as the water distributing troughs 17, between these troughs. Row 23 is superposed on row 22 and the boards in each row are inclined at an angle of approximately 45° to the vertical in opposite directions. The louvers 22 and 23 are fitted into slots in the outside vertical walls of the distributing gutters 17 between which, and adjacent to which, they are disposed. These louvers are retained in the slots without fastening means, and are readily removable, but fastening means, such as nails or bolts, may be used to secure them in place, if desired. As shown, the lower portions of the vertical sides of the distributing gutters are thicker than the upper portions, and the boards in the lower row are slightly shorter than the boards in the upper row. With this arrangement, the water entrained in the air flowing upwardly from the tower filling 15, is separated from the carrying air by the louvers 22 and 23, and falls back into the sump at the bottom of the tower.

Cooling towers embodying the invention are of less height than prior towers having the spray eliminators above the water distributing troughs and gutters, and in consequence their first cost is less. Moreover, the gutters and troughs are more readily accessible, due to the fact that it is not necessary to remove the spray eliminators to gain access to them, as in prior arrangements. And the support of the louvers on the water distributing gutters instead of on separate supporting means, provides a more simplified construction of the upper portion of the towers.

The form of the invention selected for illustration is a preferred form. Changes may be made in the form, location and relative arrangement of the several parts of the cooling tower disclosed without departing from the principles of the invention. For example, one or more than two rows of louvers may be employed, if desired, and the louvers may be supported otherwise than by the gutters, as shown. In view thereof, it will be understood that the invention is not to be limited excepting by the scope of the appended claims.

What is claimed is:

1. A cooling tower comprising means forming a cell having an air inlet and an air outlet, a filling for the cell, water distributing means including spaced gutters above the filling, said gutters having vertical outer walls with slots therein and spray eliminators comprising a plurality of louvers having their end portions in said slots to support the louvers at the same elevation as the gutters.

2. A cooling tower comprising means forming a cell having an air inlet and an air outlet, a filling for the cell, water distributing means including spaced gutters above the filling, said gutters having vertical walls with a plurality of superposed rows of spaced slots therein and spray eliminators comprising a plurality of louvers having their end portions in said slots to support the louvers from said gutters at the elevation of the gutters.

3. A mechanical draft cooling tower having a framework and sheathing therein forming a cell, the cell having an air inlet in its lower portion and an air outlet in its upper portion, a fan associated with the air outlet, a filling for the cell between the inlet and the outlet, water distributing means including spaced gutters disposed above the filling, the gutters having vertical outer walls with slots inclined to the vertical therein and spray eliminators comprising a plurality of louvers having their end portions in said slots to support the louvers at the same elevation as the gutters.

4. A mechanical draft cooling tower having a framework and sheathing therein forming a cell, the cell having an air inlet in its lower portion and an air outlet in its upper portion, a fan associated with the air outlet, a filling for the cell between the inlet and the outlet, water distributing means including spaced gutters disposed above the filling, the gutters having vertical outer walls with a plurality of superposed rows of spaced slots inclined to the vertical therein and spray eliminators comprising a plurality of louvers having their end portions in said slots to support the louvers at the same elevation as the gutters.

5. A cooling tower comprising means forming a cell having a filling therein, an air inlet below said filling, an air outlet above the filling, water distributing means including laterally spaced troughs extending in substantially the same horizontal plane above the filling and between the filling and the air outlet, said troughs having water outlets through which water flows downwardly to the filling, and spray eliminating means disposed between the troughs and in substantially the same horizontal plane therewith.

6. A cooling tower comprising means forming a cell having a filling therein, an air inlet below said filling, an air outlet above the filling, water distributing means including laterally spaced troughs extending in substantially the same horizontal plane above the filling and between the filling and the air outlet, said troughs having water outlets through which water flows downwardly to the filling, and spray eliminating means disposed between the troughs and in substantially the same horizontal plane therewith, said spray eliminating means comprising a plurality of spaced, vertically inclined louvers against which air and entrained moisture impinge, the louvers having opposite ends thereof mounted in the adjacent sides of adjacent troughs.

7. A cooling tower comprising means forming a cell having a filling therein, an air inlet below said filling, an air outlet above the filling, water distributing means including laterally spaced troughs extending in substantially the same horizontal plane above the filling and between the filling and the air outlet, said troughs having water outlets through which water flows downwardly to the filling, and spray eliminating means disposed between the troughs and in substantially the same horizontal plane therewith, said spray eliminating means comprising a plurality of superposed rows of louvers against which air and entrained moisture impinge each row having a plurality of spaced, vertically inclined louvers, the louvers of one row extending in the space between the louvers of an adjacent row and being inclined in a direction opposite to the louvers of the adjacent row.

8. A cooling tower comprising means forming a cell having a filling therein, an air inlet below said filling, an air outlet above the filling, water distributing means including laterally spaced troughs substantially rectangular shaped in cross section and extending in substantially the same horizontal plane above the filling and between the filling and the air outlet, said troughs having water outlets through which water flows downwardly to the filling, the adjacent sides of adjacent troughs having superposed rows of spaced vertically inclined slots, the slots of one row being inclined in a direction opposite to the slots in the adjacent row and extending in the space between the slots of the adjacent row, and spray eliminating means comprising a plurality of louvers extending between adjacent troughs, the opposite ends of the louvers being mounted in the slots in adjacent sides of said troughs.

9. A cooling tower comprising means forming a cell having a filling therein, an air inlet below said filling, an air outlet above the filling, water distributing means including laterally spaced elongated troughs substantially rectangular shaped in cross-section extending in substantially the same horizontal plane above the filling and between the filling and the air outlet, said troughs having water outlets through which water flows downwardly to the filling, the adjacent sides of adjacent troughs having the upper portion thereof offset inwardly from the lower portion of the sides, said offset portion extending longitudinally of the trough and having a row of spaced, vertically inclined slots therein, the lower portion having a longitudinally extending row of spaced slots in the portion thereof adjacent the space between the slots in the offset portion, the slots in the lower portion being inclined vertically in a direction opposite to the slots in the offset portion, and spray eliminating means comprising superposed rows of louvers extending between adjacent troughs, the opposite ends of the louvers of one row being mounted in the slots in said offset portion of the adjacent sides of adjacent troughs and the opposite ends of the louvers of another row being mounted in the slots in the lower portion of the adjacent sides of said adjacent troughs.

CARL S. YINGLING.

CERTIFICATE OF CORRECTION.

Patent No. 2,356,192. August 22, 1944.

CARL S. YINGLING.

It is hereby certified that error appears in the printed specification of the above numbered patent requiring correction as follows: Page 1, second column, line 49, claim 1, after the word "therein" insert a comma; page 2, first column, line 3, claim 2, after "vertical" insert --outer--; and second column, line 11, claim 7, for "imping" read --impinge--; and that the said Letters Patent should be read with this correction therein that the same may conform to the record of the case in the Patent Office.

Signed and sealed this 20th day of March, A. D. 1945.

Leslie Frazer (Seal) Acting Commissioner of Patents.